United States Patent
Hashem et al.

(10) Patent No.: US 9,131,458 B2
(45) Date of Patent: Sep. 8, 2015

(54) METHOD OF CONTROLLING BASE STATION TRANSMITTING POWER DURING SOFT HANDOFF

(75) Inventors: Bassam Hashem, Waterloo (CA); Evelyne Le Strat, Paris (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1827 days.

(21) Appl. No.: 10/893,842

(22) Filed: Jul. 19, 2004

(65) Prior Publication Data

US 2005/0130688 A1 Jun. 16, 2005

Related U.S. Application Data

(63) Continuation-in-part of application No. 09/352,299, filed on Jul. 12, 1999, now abandoned.

(51) Int. Cl.
*H04B 7/00* (2006.01)
*H04W 52/40* (2009.01)
*H04W 28/04* (2009.01)
*H04W 36/08* (2009.01)
*H04W 36/18* (2009.01)
*H04W 48/16* (2009.01)

(52) U.S. Cl.
CPC ............. *H04W 52/40* (2013.01); *H04W 28/04* (2013.01); *H04W 36/08* (2013.01); *H04W 36/18* (2013.01); *H04W 48/16* (2013.01)

(58) Field of Classification Search
USPC .......................... 455/522, 442, 437, 69–70; 370/318–320
See application file for complete search history.

(56) References Cited

U.S. PATENT DOCUMENTS

| 6,144,861 | A   | * | 11/2000 | Sundelin et al. ............ 455/522 |
| 6,356,531 | B1  | * | 3/2002  | Soliman ..................... 370/241 |
| 6,366,778 | B1  | * | 4/2002  | Bender et al. ................ 455/442 |
| 6,463,296 | B1  | * | 10/2002 | Esmailzadeh et al. ........ 455/522 |
| 6,788,685 | B1  | * | 9/2004  | Holtzman et al. ........... 370/391 |
| 7,146,142 | B1  | * | 12/2006 | Raaf ........................ 455/245.1 |
| 2004/0258024 | A1 | * | 12/2004 | Tiedemann et al. .......... 370/332 |

* cited by examiner

*Primary Examiner* — Fayyaz Alam
(74) *Attorney, Agent, or Firm* — Chiesa Shahinian & Giantomasi PC

(57) ABSTRACT

The method is for sending power control commands in a CDMA cellular radio system from a mobile station to a plurality of base stations with which the mobile station is in soft handoff. The mobile station receiving a signal from each of said base stations determines a power control command based upon the received signals. Such power control command is sent during a plurality of power control groups.

11 Claims, 4 Drawing Sheets

METHOD OF CONTROLLING BASE STATION TRANSMITTING POWER DURING SOFT HANDOFF

RELATED APPLICATIONS

This application is a Continuation-in-Part of U.S. patent application Ser. No. 09/352,299, filed Jul. 12, 1999 now abandoned, which is incorporated herein by reference in its entirety.

FIELD OF THE INVENTION

This invention relates to CDMA cellular radio systems, particularly to controlling the power level at which several base stations transmit to a mobile station that is in soft handoff among the several base stations.

BACKGROUND OF THE INVENTION

Cellular code-division multiple access (CDMA) radio systems, wherein mobile stations operate within "cells" whose outlines are determined by base transceiver stations (BTS's), are limited by interference. It is thus highly desirable to reduce interference. To limit overall interference, power control is employed in which mobile stations and base stations instruct each other to raise or lower their transmitting power so that sufficient, but not excessive, power is employed on forward and reverse links.

Depending on a mobile station's position within a cell and on the terrestrial features in the vicinity, a mobile station may be in communication with one or more BTS's. In FIG. 1, Mobile station 60 is assumed to be in communication with BTS's 40 and 50 both, over forward links 46 and 56 respectively, and over reverse links 47 and 57 respectively.

Forward link power control has two aspects: an open loop aspect and a closed loop aspect. The open loop aspect is used to compensate for the effect of distance variations and shadowing which are usually reciprocal on both links. The multipath fading conditions, however, are independent on the forward and the reverse links, and so the mobile station has to tell the base station how to adjust its power to compensate for fading. When the received energy-per-bit over noise density (Eb/N0) from the base station is high (or low), the mobile station sends a power control command (PC) every power control group (slot) asking the base station to decrease (or increase) its transmitted power. The power control command is sent at a fixed rate ($T_P$). Typical rates in third generation (3G) CDMA systems are 800 or 1600 power control commands per second.

A power control command is currently sent once during each "power control group" (A power control group is also referred to as a "slot"). The power control command may be a single bit (one state connoting increase and the other connoting decrease) or it may be a multibit command to allow changing the power by different steps.

FIG. 1 depicts portions of a conventional CDMA network. The CDMA network is a portion of the public switched telephone network (PSTN) 10. Connected to the PSTN 20 is a mobile telephone switching office (MTSO) 20. Connected to MTSO 20 is base station controller (BSC) 30, which in turn connects to BTS 40 and BTS 50. BTS's 40 and 50 are equipped with antennas 45 and 55 respectively, which transmit and receive radio signals in an area located between them and generally comprising a cell.

Handoff procedures are employed for passing a mobile user from one base station to another. A mobile station is said to undergo a hard handoff if it disconnects its transmission with the current base station and initiates transmission with a new base station. If the mobile station can communicate simultaneously with two or more base stations it is said to be in soft handoff. Soft handoff is one of the advantages that CDMA cellular systems have over other cellular systems like frequency-division multiple access (FOMA). Mobile station 60 of FIG. 1 is in soft handoff, since it is in communication with two BTS's (40 and 50).

Typically, a mobile station roaming in a cell can be in soft handoff a large percentage of the time. During soft handoff the mobile station is receiving from two or more base stations. These base stations combine the signal received from the mobile station to decode the data. The mobile station also combines the signals received from the different base stations and accordingly issues a single power control command that all the base stations should follow.

In the conventional scheme, the mobile station sends power control commands at the same rate (i.e., one command during each power control group) when it communicates with a single base station as it does when it is in soft handoff, as depicted in FIG. 2. This is known as fast power control, and is useful for tracking the changes in the communication channel due to multipath fading. A mobile station enters soft handoff when the signals received from at least two base stations are within a certain strength margin and thus gain is achievable by combining these signals (diversity gain). If the power levels of the signals are significantly different, the gain from diversity is lost. Also, if one base station starts transmitting at a high power level compared to the power level of the other base station, interference is increased which reduces the system capacity. The base stations will keep transmitting at comparable power levels if the power control commands transmitted by the mobile station can be received without error.

In practice, however, error-free reception of the power control commands is unusual. The power commands are sent uncoded to avoid the delay associated with coding; hence, even when there is a good connection between the mobile station and the BTS, the error is about 5%. If the connection is weaker, the error rate can be significantly higher. Erroneous reception of the power control commands at the base stations can result in their transmitting at markedly different power levels. This results in a loss in the diversity gain that soft handoff could provide. It further can result in increasing the interference ("noise floor") perceived by other mobile stations which reduces the overall capacity of the CDMA system.

In conventional systems, the mobile station uses the same method to issue the power control commands when it is communicating with a single base station (i.e., not in soft handoff) and when it is communicating with more than one base station (i.e., in soft handoff). However, the two situations should be dealt with differently. When the mobile sends a single power control command to the several base stations, one or more of the base stations may receive this command in error. This results in that base station transmitting at a different power level than the other base stations. This results in a loss of diversity gain that we get from soft handoff and can also increases the interference in the system, which reduces the capacity. There is thus a need to improve the reliability of transmission of power control commands from a mobile station involved in soft handoff.

It is thus an object of the present invention to provide a system for improving the reliability of transmission of power control commands from a mobile station to the base stations with which it is involved in a soft handoff.

It is a further object of the present invention to improve diversity gain in CDMA systems.

It is a further object of the present invention to reduce interference and thus increase overall capacity of CDMA systems.

These and other objects of the invention will become apparent to those skilled in the art from the following description thereof.

SUMMARY OF THE INVENTION

In accordance with the teachings of the present invention, these and other objects may be accomplished by the present systems and methods of sending power control commands from the mobile station to the base stations and of processing such commands in the base stations.

An embodiment of the present invention includes a method of sending power control commands in a CDMA cellular radio system from a mobile station to multiple base stations with which the mobile station is in soft handoff. The method includes the mobile station receiving a signal from each of the base stations. The mobile station determines a power control command based upon the received signals and sends the power control command during a plurality of power control groups.

Preferably, the sending of the power control command during a plurality of power control groups comprises transmitting said power control command during each of said plurality of power control groups.

Advantageously, the method further includes synchronizing transmission power levels of the base stations after some other number of power control groups.

Another embodiment of the invention includes a computer program element comprising computer program code means arranged to make a mobile station execute procedure to perform the steps of the above method.

Still another embodiment of the invention includes an apparatus for sending power control commands in a CDMA cellular radio system from a mobile station to a plurality of base stations with which the subscriber unit is in soft handoff. The apparatus comprises means for receiving a signal from each of said base stations, means, coupled to said means for receiving, for determining a power control command based upon said received signals, and means for sending said power control command during a plurality of power control groups, preferably by transmitting said power control command during each of said plurality of power control groups.

An embodiment of the invention includes a radiocommunication mobile station incorporating an apparatus as defined hereabove for sending power control commands in a CDMA cellular radio system.

Still another embodiment of the invention includes a method of controlling transmission power of a base station in a CDMA cellular radio system, said base station being in communication with at least one mobile station. The method comprises receiving a plurality of copies of a power control command from said mobile station during a plurality of power control groups, and combining said plurality of copies to form one command for adjusting transmission power of said base station towards said mobile station. A computer program element comprising computer program code means arranged to make a base station execute procedure to perform the steps of such method is also provided.

Another embodiment of the invention includes an apparatus for controlling transmission power of a base station in a CDMA cellular radio system, said base station being in communication with at least one mobile station. The apparatus comprises means for receiving a plurality of copies of a power control command from said mobile station during a plurality of power control groups, means for combining said plurality of copies to form one command, and means for adjusting transmission power of said base station towards said mobile station based on said one command. A radiocommunication base station incorporating such an apparatus for a controlling transmission power thereof in a CDMA cellular radio system is also provided.

The present invention advantageously provides a system for improving the reliability of transmission of power control commands from a mobile station to the base stations with which it is involved in a soft handoff.

Further, the present invention improves diversity gain in CDMA systems.

Also, the present invention beneficially reduces interference and thus increases overall capacity of CDMA systems.

The invention will next be described in connection with certain exemplary embodiments; however, it should be clear to those skilled in the art that various modifications, additions and subtractions can be made without departing from the scope of the claims.

DESCRIPTION OF PREFERRED EMBODIMENTS

This invention relates to power control commands sent during soft handoff. In overview, instead of sending one power control command during each power control group, the present invention proposes to send a power control command over multiple power control groups. This method provides more error protection to the power control commands and reduces the rate at which base stations adjust their power. This configuration also reduces the deviation between the transmission powers of the base stations and allows more time for a central controller to balance the base station transmission powers.

In order to maintain compatibility with conventional power control, the mobile station may send the power control commands at the same rate ($T_P$), determined according to the data frame duration and the number of slots per frame. Those skilled in the art will recognize that the rate could be such that the system is not backward compatible and still fall within the scope of the invention.

Figure 3:
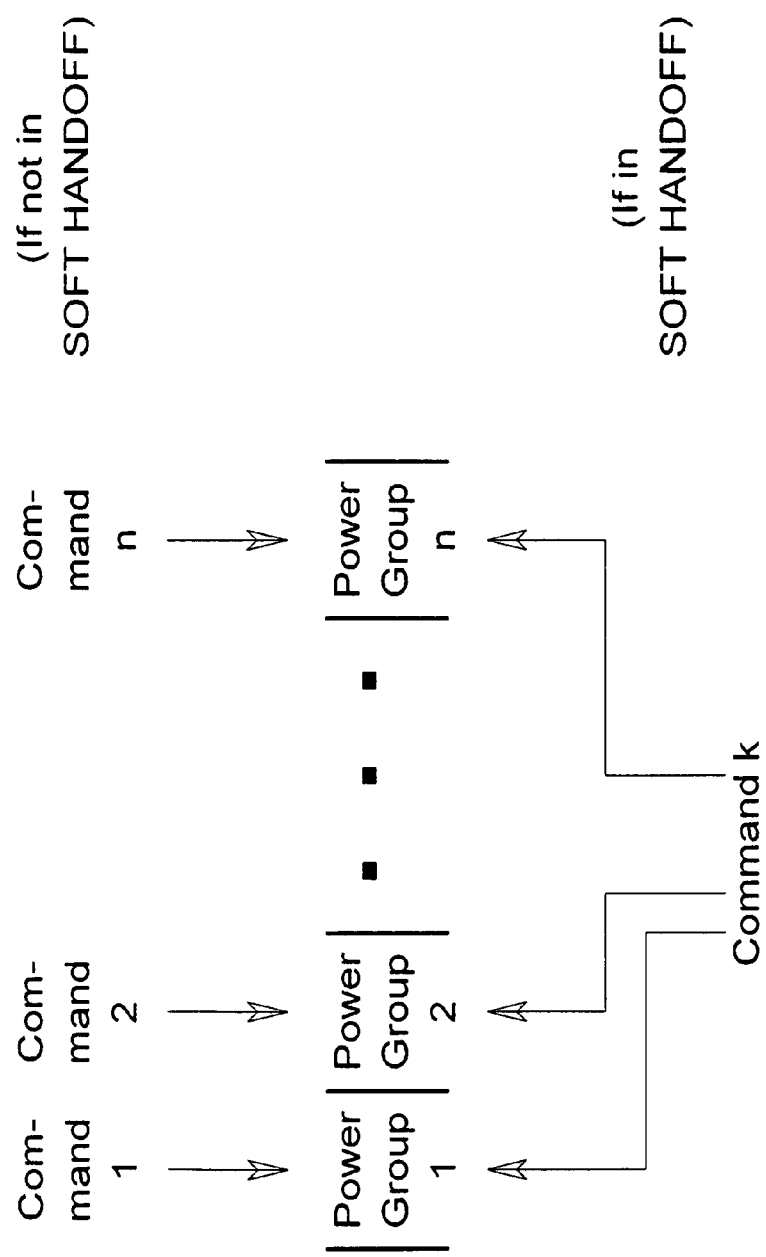
FIG. 3 illustrates the method of the present invention of sending power control commands from a mobile station in a CDMA cellular system.

However, a mobile station in soft handoff sends a power control command over several slots instead of sending a power control command over a single slot. This is shown in FIG. 3. Each base station involved in soft handoff can change its power level every n slots, rather than every slot.

Sending the power control command over n slots may take several different forms. It is possible to repeat the command each slot. In this case, the power command can be decoded after receiving each slot and then all the n decoded copies are combined to form one command, or the decoding of the power command can be done only once after receiving all n slots. However, in accordance with the invention, a portion of the command is sent during each slot so that it takes n slots to send the entire power control command. An advantage of this latter method is that the command may be coded into a multi-bit code and a portion of the multi-bit code sent each slot. It is also possible to combine these two methods such that one or more portions of a power control command are sent multiple times and the entire power control command may thus be sent multiple times spread over multiple slots.

Distributing one power control command over several slots results in reducing the error rate of the commands. Another advantage of reducing the control rate (i.e. once every n slots compared to once per slot) is reducing the deviation between the transmission power levels of the base stations since the base stations adjust their powers less often.

The present invention keeps the transmitted powers, of the base stations involved in a soft handoff, close to one another in magnitude. By way of example, assume the mobile station is in soft handoff with two base stations (although those skilled in the art appreciate that the number of base stations can be greater than two). The mobile station typically (although not necessarily) sends power control commands at a rate of 1600 commands/sec. The mobile station combines the signals from the two base stations using a RAKE receiver and accordingly determines a single power control command that both base stations should follow. In practice, some of these power control bits are received in error at a base station depending on the quality of the reverse link between the mobile station and the specific base station. By way of example, a frame error rate for both links is assumed to be 1%. Under this assumption, the difference in the transmitted power from the two base stations is considered for four different cases:
 1—The mobile issues a power command every power control group. Base stations' transmitted powers are not synchronized.
 2—The mobile issues a power control command every power control group. Base stations' transmitted powers are synchronized every 10 frames based on the quality of the reverse link.
 3—The mobile issues a single power control command every 4 power control groups. (This is an embodiment of the invention with n equal to 4.) Base stations' transmitted powers are synchronized every 10 frames based on the quality of the reverse link.
 4—The mobile issues a power control command every power control group. Base stations' transmitted powers are synchronized every 2 frames based on the quality of the reverse link.

Figure 1:
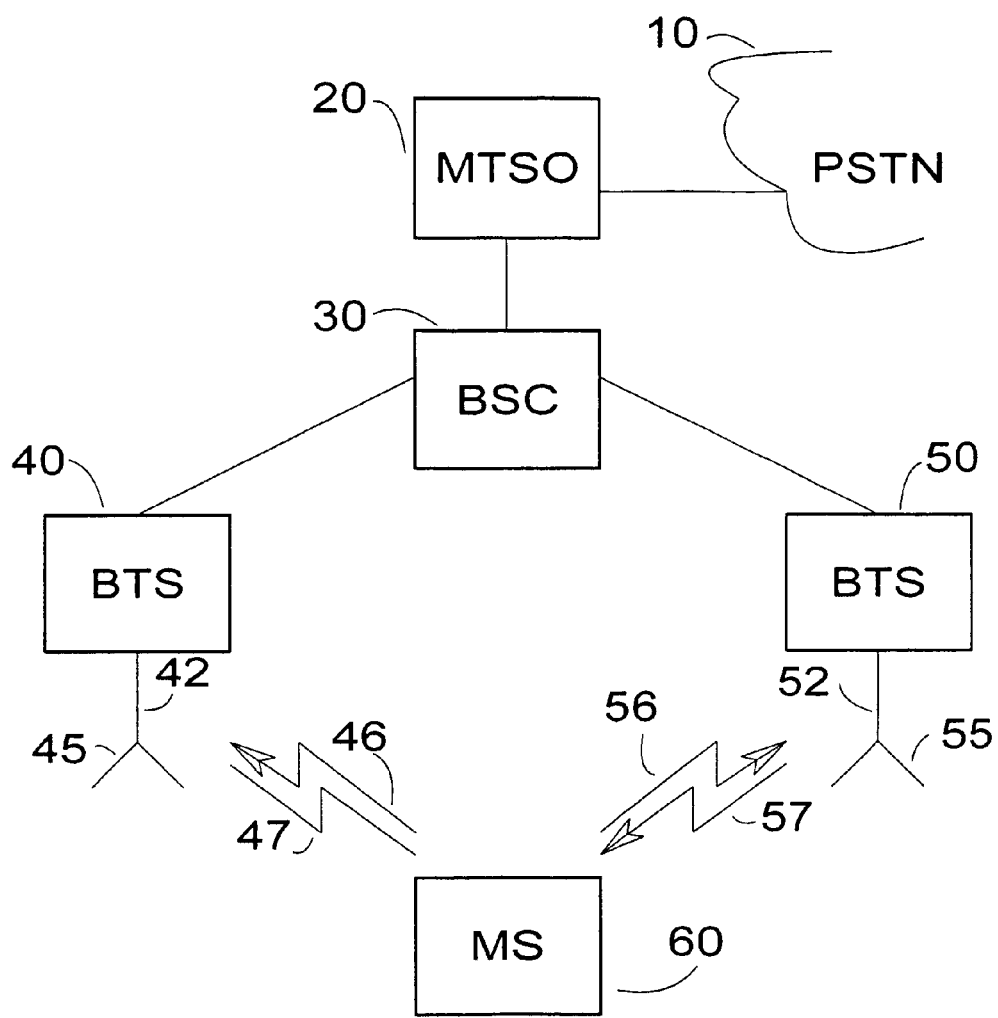
FIG. 1 (prior art) is a high-level block diagram of a portion of a CDMA cellular system with a mobile station in soft handoff.
Figure 2:
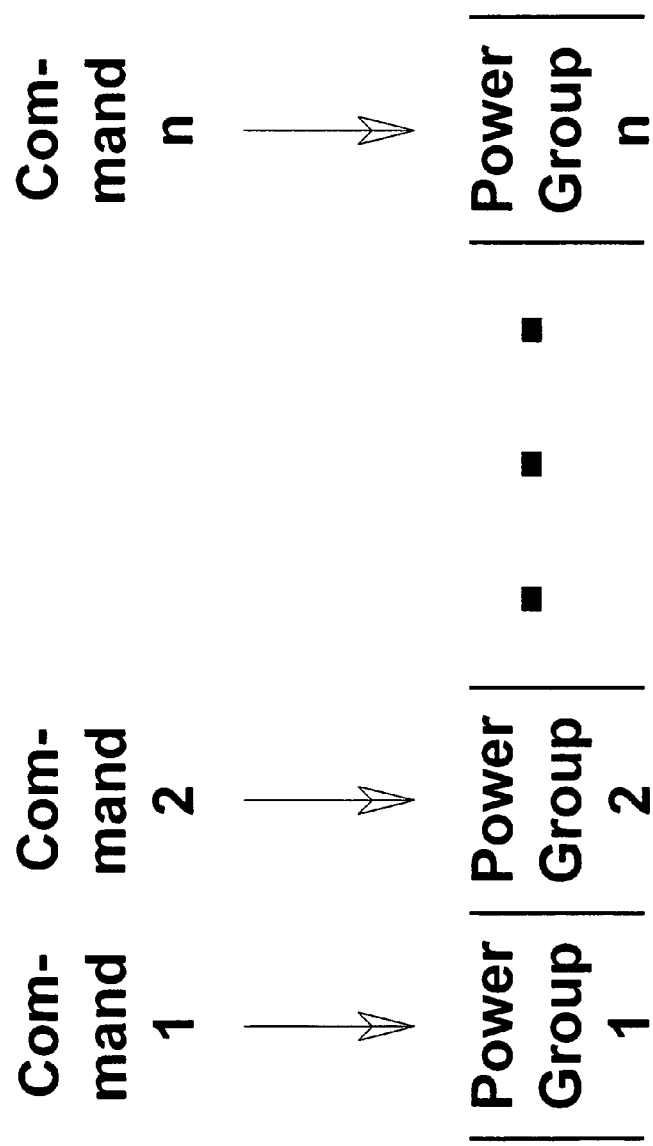
FIG. 2 (prior art) illustrates conventional methods of sending power control commands from a mobile station in a CDMA cellular system.

Assuming base station 40's (FIG. 1) transmitted power to be x and base station 50's transmitted power to be y, z is defined to be |x-y|.

Figure 4:
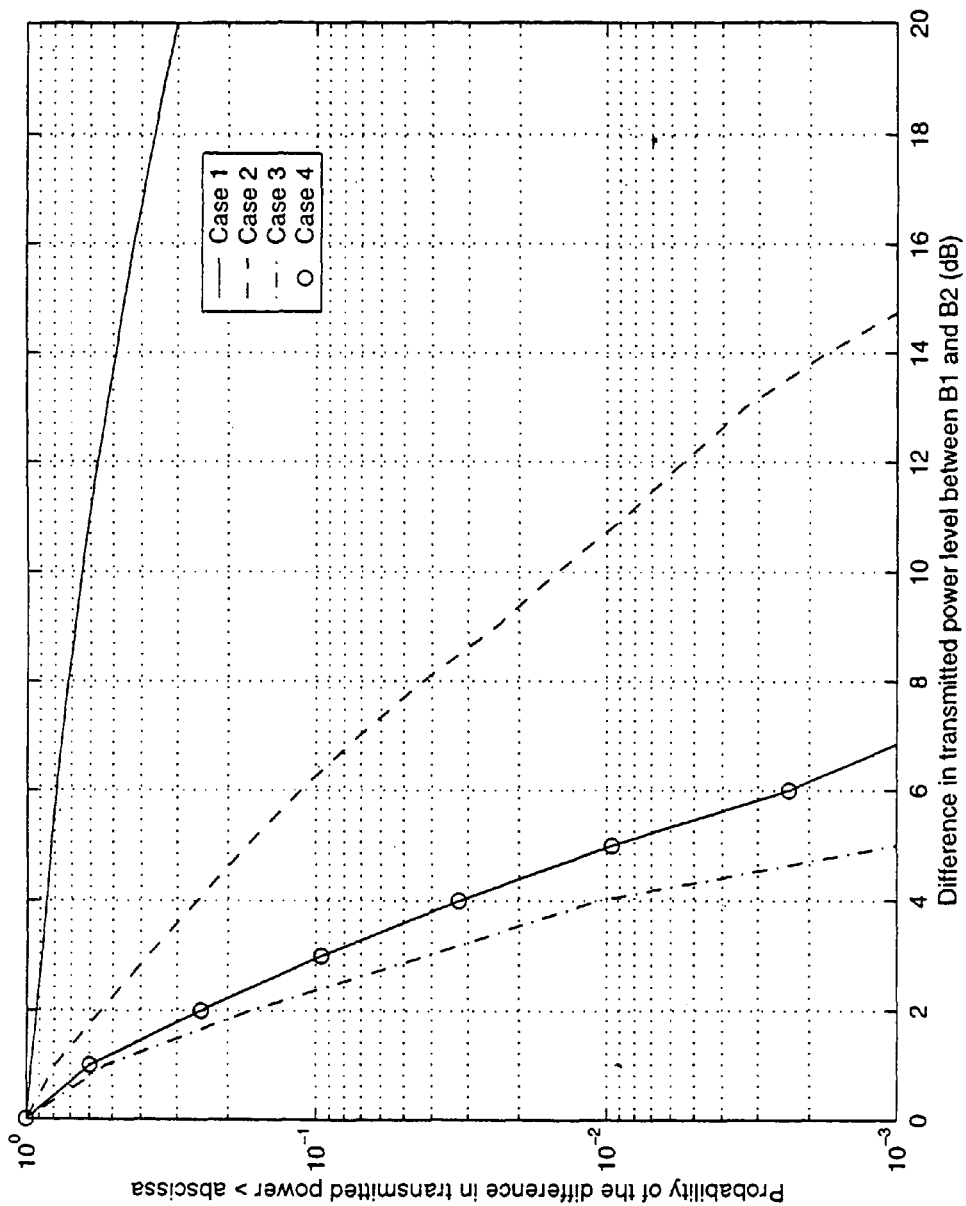
FIG. 4 plots the performance of several methods of sending power control commands including the method of the present invention.

FIG. 4 shows the complementary cumulative distribution function of z for the four above-mentioned cases. Clearly, case 1 needs to be ameliorated in order to retain the benefits anticipated from the use of soft handoff. Synchronizing the base stations (under control of BSC 30 (FIG. 1) according to reports from base stations 40 and 50) every few frames does help in reducing the difference in the transmitted powers. However, this is inherently a slow process because of the necessary signaling and can require many frames. A considerable reduction in the difference in the transmitted powers is obtained by applying the present invention (case 3). The results in case 3 are better than case 4 even though case 3 employs fewer synchronizations.

Those skilled in the art realize that specific numbers discussed in the above cases and examples are exemplary and not limiting and that the invention may be used in configurations representing a broad range of design choices. It will thus be seen that the invention efficiently attains the embodiments set forth above, among those made apparent from the preceding description. The invention improves the reliability of transmission of power control commands from a mobile station involved in soft handoff.

In particular, the invention provides a system for improving the reliability of transmission of power control commands from a mobile station to the base stations with which it is involved in a soft handoff. The invention further provides improvement of diversity gain in CDMA systems. The invention further reduces interference and thus increases overall capacity of CDMA systems. Those skilled in the art will appreciate that the configurations depicted in FIGS. 3 and 4 provide these improvements.

By way of summary, a mobile station in a CDMA cellular radio system transmits a possibly unique power control command every power control group time when the mobile station is in contact with a single base station. When the mobile station is in soft handoff (in communication with two or more base stations simultaneously), however, the mobile station sends the same power control command for several power control group times, thus reducing the probability of receiving an erroneous power control command at a base station. The base stations synchronize their power levels periodically according to a predetermined number of power control command groups, resulting in more optimum base station power transmission levels, in turn resulting in a reduction in system noise and an increase in system capacity.

It will be understood that changes may be made in the above construction, and in the foregoing sequences of operation, without departing from the scope of the invention. It is accordingly intended that all matter contained in the above description or shown in the accompanying drawings be interpreted as illustrative rather than in a limiting sense. The present invention can, for example, be realized in the form of a computer program product supporting code modules that enable operation according to the present invention. Indeed, the program code could be provided to equipment by way of an over-the-air or wireline download of a Java Applet or the like.

The invention claimed is:

1. A method of sending power control commands in a CDMA cellular radio system from a mobile station to a plurality of base stations with which the mobile station is in soft handoff, comprising:
 receiving, at the mobile station, a signal from each of the plurality of base stations;
 repeatedly determining, at the mobile station, a power control command based upon said received signals; and
 sending said each power control command during a plurality of power control groups, wherein each power control command sent during the plurality of power control groups combine to form a single command.

2. The method according to claim 1, wherein sending said each power control command during a plurality of power control groups comprises transmitting said power control command during each of said plurality of power control groups.

3. The method according to claim 1, further comprising synchronizing transmission power levels of the base stations after another plurality of power control groups.

4. A computer program element comprising computer program code stored on a non-transitory computer readable medium and which, when executed by a computer, will make a mobile station of a CDMA cellular radio system execute procedure to perform the steps of: receiving a signal from each of a plurality of base stations of the CDMA.

5. Apparatus for sending power control commands in a CDMA cellular radio system from a mobile station to a plurality of base stations with which the mobile station is in soft handoff, the apparatus comprising:

a processor; and a memory to store computer program instructions, the computer program instructions when executed on the processor cause the processor to perform operations comprising:

receiving a signal from each of the plurality of base stations;

repeatedly determining a power control command based upon said received signals; and sending said each power control command during a plurality of power control groups, wherein each power control command sent during the plurality of power control groups combine to form a single command.

6. The apparatus according to claim 5, wherein said sending step comprises transmitting said power control command during each of said plurality of power control groups.

7. A radiocommunication mobile station incorporating an apparatus for sending power control commands in a CDMA cellular radio system to a plurality of base stations with which the mobile station is in soft handoff, wherein said apparatus comprises:

a processor; and a memory to store computer program instructions, the computer program instructions when executed on the processor cause the processor to perform operations comprising:

receiving a signal from each of the plurality of base stations;

repeatedly determining a power control command based upon said received signals; and sending said each power control command during a plurality of power control groups, wherein each power control command sent during the plurality of power control groups combine to form a single command.

8. The method according to claim 1, wherein said sending step comprises sending identical copies of said power control command in different ones of said plurality of power control groups.

9. The computer program element according to claim 4, wherein said sending step comprises sending identical copies of said power control command in different ones of said plurality of power control groups.

10. The apparatus according to claim 5, wherein said sending step comprises sending identical copies of said power control command in different ones of said plurality of power control groups.

11. The mobile station according to claim 7, wherein said sending step comprises sending identical copies of said power control command in different ones of said plurality of power control groups.

* * * * *